United States Patent [19]

Wrue

[11] 3,835,596
[45] Sept. 17, 1974

[54] APPARATUS FOR AND METHOD OF REMOVING MATERIAL FROM A FLEXIBLE CONTACT LENS

[75] Inventor: Richard J. Wrue, Rochester, N.Y.

[73] Assignee: Bausch & Lomb Incorporated, Rochester, N.Y.

[22] Filed: Aug. 10, 1972

[21] Appl. No.: 279,554

[52] U.S. Cl. ............................ 51/284, 51/124 L
[51] Int. Cl. ............................................. B24b 1/00
[58] Field of Search .. 29/76, 90; 51/124 L, 106 LG, 51/284, 289 S

[56] References Cited
UNITED STATES PATENTS

| 2,990,664 | 7/1961 | Cepero | 51/284 |
| 3,112,581 | 12/1963 | Hoffman | 51/284 X |
| 3,369,329 | 2/1968 | Beiman | 51/284 |
| 3,458,959 | 8/1969 | Urbach | 51/284 X |

Primary Examiner—Leonidas Vlachos
Attorney, Agent, or Firm—Frank C. Parker; Bernard D. Bogdon; Dewitt M. Morgan

[57] ABSTRACT

Apparatus for contouring the edge of a lens of hydrophillic hydrogel material while in its anhydrous state and secured or firmly supported in a lens mold. The lens, which together with the mold constitute an assembly, has an edge adjacent but inwardly spaced from the face of the mold. The apparatus includes a rotatable shaft which has a material removing surface in the form of a finely textured sphere secured to its free end. The lens and mold assembly is supported on the free end of a pivotable arm that is spring biased into engagement with a rotatable cam. Rotation of the cam permits movement of the arm between a first position where the lens and its supporting mold are spaced from the material removing surface and a second position where the edge of the lens is placed in engagement with the material removing surface and removed by abrading.

5 Claims, 4 Drawing Figures

PATENTED SEP 17 1974 3,835,596
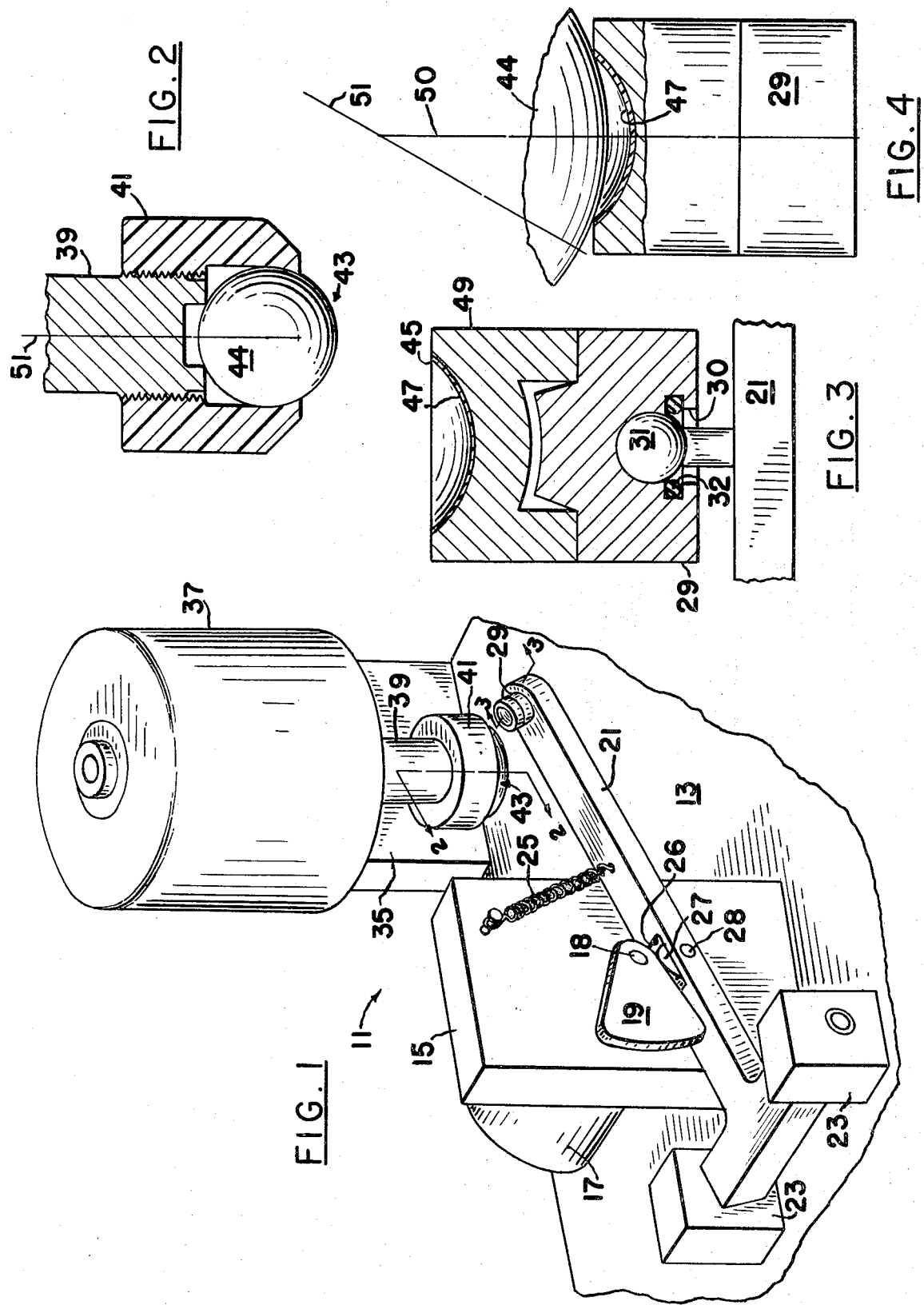

APPARATUS FOR AND METHOD OF REMOVING MATERIAL FROM A FLEXIBLE CONTACT LENS

CROSS-REFERENCE TO RELATED APPLICATION

The present invention is related to the invention described in concurrently filed application Ser. No. 279,555 for "Apparatus for Rounding the Edge of a Flexible Contact Lens" by Norbest J. Coyne and Richard J. Wrue and assigned to the assignee of the present invention.

BACKGROUND OF THE INVENTION

1. Field of the Invention

This invention relates to a novel apparatus for removing material from an ophthalmic lens of hydrophilic hydrogel material while in its anhydrous state and secured in a lens mold. The lens is flexible in its hydrated state.

2. Description of the Prior Art

Early methods in the industry for edge contouring flexible ophthalmic lenses included hand finishing which is entirely unsatisfactory for mass production. Other methods are disclosed in U.S. Pat. No. 3,423,886 issued to F. Schpak et al. on Jan. 28, 1969. Finally, attention is also directed to U.S. application Pat. No. 3,736,183 of Israel Schrier for "Apparatus for and Method of Edge Machining Flexible Contact Lenses" issued May 29, 1973.

BRIEF SUMMARY OF THE INVENTION

This invention relates to removing material from an ophthalmic lens preferably formed of hydrophilic hydrogel material while it is in its anhydrous state and firmly supported in a lens mold. The apparatus includes a material removing surface having a generally arcuate cross-section secured to the free end of a rotatable shaft. The lens mold is positioned on a pivotal support. The shaft and support are movable relative to each other between a first position where the lens is held out of engagemewith the material removing surface to a second position where at least a portion of the lens is in engagement with the material removing surface.

Accordingly, it is an object of this invention to remove material from a flexible lens while it is secured or firmly supported in a mold thereby shortening the production cycle and improve yields and consistency.

Other and further objects and advantages of the present invention should become apparent from an examination of the drawings and accompanying description.

BRIEF DESCRIPTION OF THE DRAWINGS

FIG. 1 is a perspective view of the apparatus;

FIG. 2 is a partial sectional view taken along line 2—2 of FIG. 1;

FIG. 3 is a partial sectional view taken along line 3—3 of FIG. 1; and

FIG. 4 is a partial sectional view showing the lens edge at the instant of engagement with the material removing surface.

DESCRIPTION OF THE PREFERRED EMBODIMENT

Referring to the drawings in detail the apparatus for removing material from the flexible contact lens is generally designated 11. It includes a base or support structure 13 having an upright 15 supporting motor 17 in the manner illustrated in FIG. 1. The shaft 18 of motor 17 projects through upright 15 and carries cam 19. Motor 17 is connectable to a suitable source of electric power (not shown).

Apparatus 11 also includes a pivotal arm 21 secured to base 13 by a pair of bearing blocks 23. Intermediate its ends arm 21 is provided with a rectangular opening 26 in which is received circular disc 27 rotatably supported on pin 28. As illustrated in FIG. 1 tension spring 25, secured between upright 15 and arm 21, biases disc 27 into engagement with the peripheral surface of cam 19. With this arrangement rotation of cam 19 about the axis of the motor shaft 18 moves the free end of arm 21 in an arcuate path. The length of time arm 21 remains at the end positions of this path will depend upon the configuration of cam 19.

The free end of arm 21 carries lens mold support member 29. As is best shown in FIG. 3, support member 29 is provided with a cavity 30 that receives ball support 31 attached to the free end of arm 21. O-ring 32 prevents disengagement of ball 31 from cavity 30. This arrangement forms a ball-and-socket type joint which permits support member 29 to rotate about its own longitudinal axis and to pivot from side to side about the longitudinal axis of ball support 31.

Base 13 also includes a second upright 35 for positioning motor 37 in the manner illustrated in FIG. 1. Motor 37, like motor 17, is connected to a suitable source of electric power (not shown). Secured to the free end of motor shaft 39, via collar 41, is a material remover generally designated 43. In the preferred embodiment material remover 43 constitutes a metal sphere having a finely textured surface 44 of approximately 30 RMS. Collar 41 is made of plastic which provides a rigid attachment between shaft 39 and material remover 43 without damaging non-exposed portions of surface 44. Such construction permits the sphere to be rotated to expose an unused surface portion when the originally exposed hemispherical area has been worn down.

The above described apparatus is designed to remove the inner edge 45 of lens 47 which is preferably fabricated of cross-linked hydrophilic polymer as disclosed in U.S. Pat. Nos. 2,976,576 and 3,220,960. Lens 47 is spin cast in lens mold 49 by rotating mold 49 about its longitudinal axis during the polymerizing of the constituent materials. See U.S. Pat. No. 3,408,429 issued Oct. 29, 1968. As is evident from FIG. 4 the radius of curvature of lens 47 is smaller than the radius of curvature of surface 44.

In operation motors 17 and 35 are energized thereby rotating, respectively, cam 19 and material remover 43. When cam 19 positions the free end of arm 21 furthest from material remover 43, lens 47, while still in its anhydrous state and secured in mold 49, is placed on lens mold support member 29. Continued rotation of cam 19 allows arm 21, under the bias of tension spring 25, to move toward material remover 43 to thereby place edge 45 in contact with material removing surface 44 as shown in FIG. 4. Relative rotation between surface 44 and lens 47 removes a small amount of material from edge 45.

The fact that lens mold support member 29 is free to pivot about the axis of ball 31 allows lens 47 to center itself thereby permitting substantially simultaneous engagement of all portions of edge 45 with surface 44. It should also be noted that to insure uniform edging of each lens cam 19 is so configured that it is out of engagement with disc 27 when edge 45 is in engagement with surface 44. The period of disengagement between disc 27 and cam 19 determines the length of time of engagement between edge 45 and surface 44. This length of time of engagement and the force applied by tension spring 25 determines the amount of material removed from edge 45. Reengagement of cam 19 with disc 27 ends the edging operation and moves lens 47 and mold 49 away from surface 44 for removal from arm 21. Since, for a given cam configuration and a given tension spring, both the length of time of engagement and the force of engagement will be constant, successive lenses will be edged an equal amount and will have the same finished dimensions.

Since lens mold support member 29 is free to rotate about ball 31, lens 47 and mold 49 will be free to rotate about lens mold axis 50. Thus, if the engagement of edge 45 with the surface 44 is concentric with the axis of rotation 51 of surface 44 the lens 47 and lens mold 49 would spin with the same angular velocity as surface 44 and, disregarding slippage, no material would be removed from edge 45. If, however, axis 50 is offset from axis 51 so that the area of contact between lens 47 and surface 44 does not enclose axis 51, as is shown in FIG. 4, different portions of the edge 45 will have different linear velocities relative to axis 51 which would tend to rotate lens 47 and mold 49 in an arcuate path. The surface generated by such movement would be in the form of a toroid concentric with axis 51. However, since the lens 47 is secured to lens mold support member 29 it is not free to so rotate with surface 44 and, accordingly, the different forces (resultant from the aforesaid different linear velocities) acting on the area of contact between edge 45 and surface 44 will cause lens 47 to rotate about its own axis relative to the surface 44. This relative rotation results in material being abraded from edge 45.

Whereas the drawing and accompanying description have shown and described the preferred embodiment of the present invention it should be apparent to those skilled in the art that various changes may be made in the form of the invention without affecting the scope of the invention.

What I claim is:

1. Apparatus for edging an ophthalmic lens while it is secured in a mold, said mold having a face, said lens having an edge portion which is adjacent said face, said lens and mold constituting an assembly, said apparatus comprising:
   a. base means;
   b. lens mold supporting means;
   c. material removing means including a rotatable material removing surface;
   d. means for securing one of said lens mold supporting means and said material removing means relative to said base means;
   e. means secured to said base means for moving the other of said lens mold supporting means and said material removing means along a prescribed path between a first position wherein said lens mold supporting means holds said lens and mold assembly out of engagement with said material removing surface and a second position wherein said edge of said lens is held in engagement with said material removing surface; and
   f. means for automatically centering said lens on said material removing surface when said edge is brought into contact with said material removing surface for uniform contouring of said edge, said centering means being provided on one of said lens mold supporting means and said material removing means.

2. The apparatus as set forth in claim 1 wherein said centering means is provided on said lens mold supporting means and includes a support member and a lens mold holder member pivotally attached to said support member.

3. The apparatus as set forth in claim 1 wherein said moving means includes force applying means and positioning means, said force applying means biasing said lens mold supporting means and said material removing means towards each other, said positioning means acting on said other of said lens mold supporting means and said material removing means in opposition to said force applying means when said other of said lens mold supporting means and said material removing means is in said first position, said positioning means being out of engagement with said other of said lens mold supporting means and said material removing means when said other of said lens mold supporting means and said material removing means is in said second position.

4. The apparatus as set forth in claim 3 wherein said positioning means is a rotatable cam, said cam engaging said other of said lens mold supporting means and said material removing means through a first portion of its rotation, said cam being out of engagement with said other of said lens mold supporting means and said material removing means during the second portion of its rotation, said force applying means holding said lens in engagement with said material removing surface during said second portion of said rotation, said force applying means determining the force by which said lens engages said material removing surface, the duration of said second portion determining the period of engagement whereby successively edged lenses will have the same finished dimensions.

5. A method of edge contouring an ophthalmic lens with an edge contouring apparatus, said lens being firmly supported in a lens mold and constituting with said mold a lens and mold assembly, said mold having a face, said lens having an edge adjacent said face, said edge contouring apparatus including a rotating material removing surface, said method comprising:
   a. placing said lens and mold assembly in a position spaced from said surface with said lens edge facing said surface;
   b. inducing relative movement along a prescribed path between said surface and said lens and mold assembly;
   c. automatically centering said lens on said surface to thereby substantially simultaneously engage all portions of said edge with said surface;
   d. maintaining said edge in engagement with said surface with a constant force for a preselected period of time to thereby remove a portion of said edge; and
   e. automatically disengaging said edge from said rotating material removing surface.

* * * * *

UNITED STATES PATENT OFFICE
CERTIFICATE OF CORRECTION

Patent No. 3,835,596    Dated October 8, 1974

Inventor(s)    Richard J. Wrue

It is certified that error appears in the above-identified patent and that said Letters Patent are hereby corrected as shown below:

Column 1, line 9, change "Norbest" to --Norbert--; and
Column 1, line 26, after "U.S." delete "application".

Signed and sealed this 26th day of November 1974.

(SEAL)
Attest:

McCOY M. GIBSON JR.
Attesting Officer

C. MARSHALL DANN
Commissioner of Patents